(12) United States Patent
Lee

(10) Patent No.: US 8,141,262 B1
(45) Date of Patent: Mar. 27, 2012

(54) DEVICE FOR MEASURING THE LENGTH OF A FISH

(76) Inventor: San Fu Lee, Tampa, FL (US)

(*) Notice: Subject to any disclaimer, the term of this patent is extended or adjusted under 35 U.S.C. 154(b) by 0 days.

(21) Appl. No.: 12/897,833

(22) Filed: Oct. 5, 2010

(51) Int. Cl.
*A01K 97/00* (2006.01)
*G01B 5/02* (2006.01)
*G01B 3/10* (2006.01)

(52) U.S. Cl. .......................... 33/511; 33/549

(58) Field of Classification Search ............ 33/511, 33/755, 759, 760, 549, 551; 43/54.1
See application file for complete search history.

(56) References Cited

U.S. PATENT DOCUMENTS

| 1,474,804 | A | * | 11/1923 | Tyrrell | 33/567 |
| 3,259,988 | A | * | 7/1966 | Lunn | 33/549 |
| 5,097,617 | A | * | 3/1992 | Craven | 43/4 |
| 5,148,607 | A | * | 9/1992 | Lasiter | 33/549 |
| 5,339,532 | A | * | 8/1994 | O'Keefe | 33/511 |
| 5,526,575 | A | * | 6/1996 | Hoover et al. | 33/485 |
| 5,637,838 | A | * | 6/1997 | Arey et al. | 177/148 |
| 6,115,932 | A | * | 9/2000 | Fedora | 33/758 |
| 6,415,521 | B1 | * | 7/2002 | Schnell | 33/511 |
| 6,594,939 | B2 | * | 7/2003 | Ondusko | 43/4 |
| 6,615,532 | B2 | * | 9/2003 | Abel | 43/7 |
| 6,765,155 | B1 | * | 7/2004 | Gray | 177/148 |
| D506,398 | S | * | 6/2005 | Bunkowfst | D10/70 |
| 6,989,499 | B2 | * | 1/2006 | Bortolloni et al. | 200/50.05 |
| 7,191,536 | B1 | * | 3/2007 | Bailey | 33/511 |
| 7,665,220 | B1 | * | 2/2010 | Gee | 33/511 |
| 7,814,673 | B2 | * | 10/2010 | Gonzalez et al. | 33/511 |
| 2005/0223616 | A1 | * | 10/2005 | Beasley | 43/4 |
| 2005/0274032 | A1 | * | 12/2005 | Martin | 33/511 |
| 2005/0278967 | A1 | * | 12/2005 | Du Plessis | 33/493 |
| 2006/0005460 | A1 | * | 1/2006 | Bittrick | 43/43.4 |
| 2007/0209219 | A1 | * | 9/2007 | Ertmer | 33/511 |
| 2011/0192046 | A1 | * | 8/2011 | Kinziger | 33/759 |
| 2011/0208479 | A1 | * | 8/2011 | Chaves | 702/187 |

FOREIGN PATENT DOCUMENTS

CA 2386344 A1 * 11/2003

* cited by examiner

*Primary Examiner* — Christopher Fulton
(74) *Attorney, Agent, or Firm* — Ronald E. Smith; Smith & Hopen, P.A.

(57) ABSTRACT

A fish measuring device includes a flat, flexible base and an elongate, flexible tape measure secured to the base. A fish is positioned atop the base and the base is wrapped around the fish to inhibit its movement. Releasable fasteners maintain the base in the wrapped configuration during the measurement. The tape measure is extended into parallel, overlying relation to the fish so that the length of the fish may be measured. At least one stiffener is disposed in sliding engagement to the tape measure and is held in a vertical plane near the head of the fish. The tape measure is held taut from an exit point of the stiffener in parallel relation to the fish so that the measurement can be made. At least one suction cup is formed in a reverse side of the base so that the base is releasably secured to a flat support surface.

9 Claims, 8 Drawing Sheets

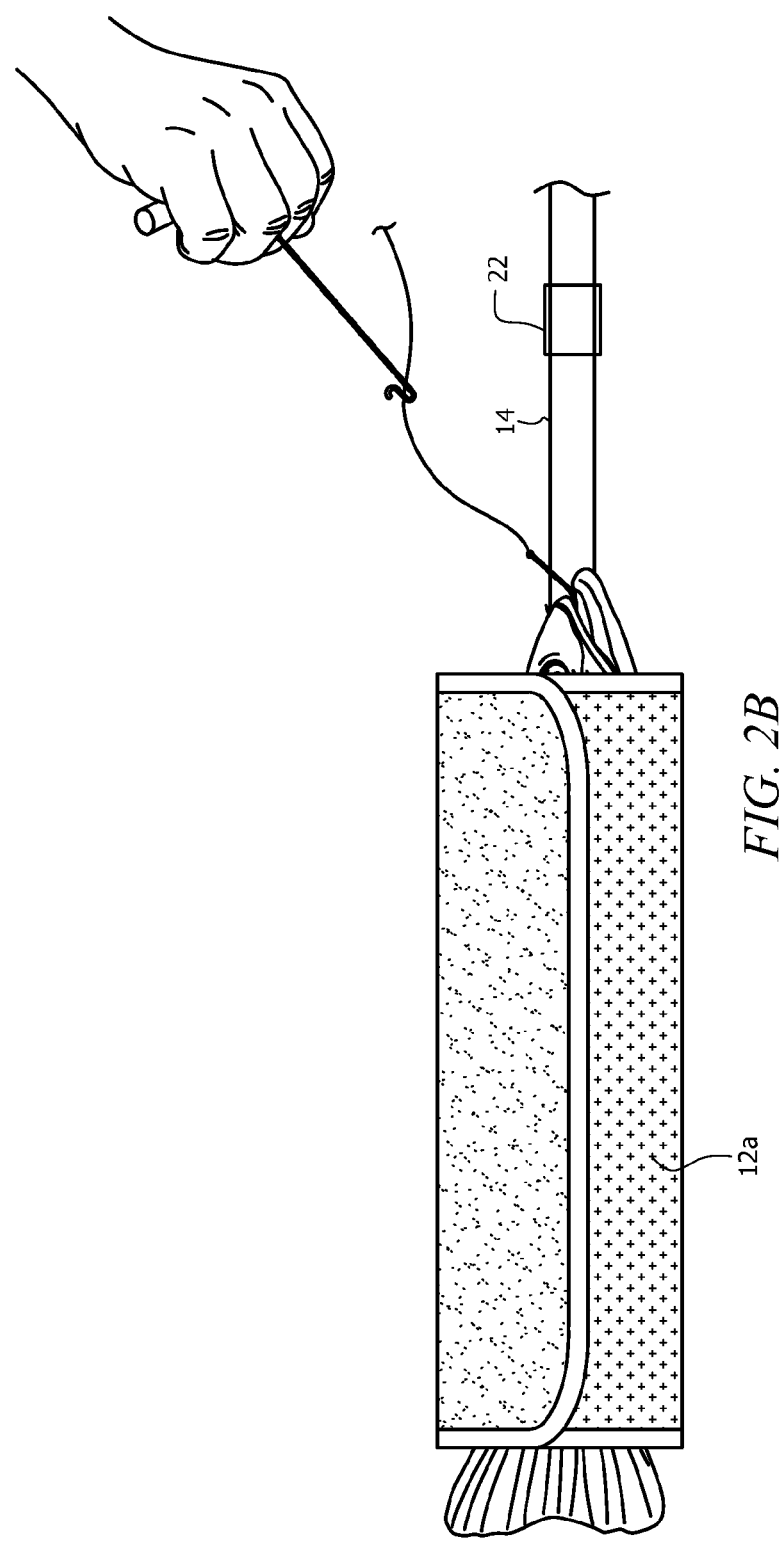

DEVICE FOR MEASURING THE LENGTH OF A FISH

BACKGROUND OF THE INVENTION

1. Field of the Invention

This invention relates, generally, to devices that measure the length of living animals, including fish. More particularly, it relates to a device that enables a person to quickly measure the length of a fish without touching the fish.

2. Description of the Prior Art

Most countries have laws that require the length or weight, or both, of a fish to be measured when caught to protect natural resources. The laws require release of fish found to be below or over prescribed lengths or weights so that fish populations are not depleted.

However, the act of measuring the length or weight of a fish on board a boat can kill the fish, thereby defeating the purpose of the law. Typically, the fish will thrash violently, thereby requiring much more oxygen than when it is immersed in water and moving about non-violently. The fish thus succumbs to lack of oxygen.

Thus there is a need for a device that limits the ability of a fish to thrash around as attempts are made to measure its length or weight, or both.

Handling fish in order to measure their length or weight also causes the hands of the person performing the measurement to develop an unpleasant smell.

Therefore there is also a need for a device that enables a person to measure the length or weight of a fish without making physical contact with the fish.

Removing a fishhook from a thrashing fish is also problematic, i.e., the person removing the hook can be cut, punctured, or otherwise hurt.

Therefore there is also a need for a device that facilitates fishhook removal prior to measuring the length or weight of a fish without making physical contact with the fish so that the fishhook can be removed safely.

However, in view of the art considered as a whole at the time the present invention was made, it was not obvious to those of ordinary skill in the art how the known methods and devices for measuring fish length or weight, or both, could be improved.

SUMMARY OF THE INVENTION

The long-standing but heretofore unfulfilled need for improved devices and methods for measuring the length or weight of a fish or other live animal is now met by a new, useful, and non-obvious invention.

The inventive structure is a fish holding device that includes a base formed of a flat, flexible and waterproof sheet of material having a front side, a reverse side, and a predetermined geometric configuration. The preferred predetermined geometric configuration of the base is rectangular with rounded corners.

The base is partitioned into top, middle, and bottom longitudinally-extending sections. The top and bottom sections are at least partially covered in mating hook and loop fastening material such as VELCRO® fastening material so that a fish overlying the front side of the base is wrapped in the device when the base is wrapped around the fish.

More particularly, where the girth of a fish is small enough to enable the fish to be wrapped in the base alone, the fish is placed on the front side of the base so that the longitudinal axis of symmetry of the fish is substantially coincident with the longitudinal axis of symmetry of the base.

The bottom of the base is folded upwardly over the belly of the fish, thereby bringing the bottom section of the base into overlying relation to the fish. The top of the base is then folded downwardly over the spine of the fish, thereby bringing the fastening material that at least partially overlies the top section of the base into overlying relation to the fastening material that at least partially covers the bottom section of the base.

The order of folding may be reversed to obtain the same results if mating fastening material at least partially covers the sides of the top and bottom sections that are brought into engagement with one another when folded. If the top section is folded first, fastening material is provided that at least partially covers the reverse side of said top section and the front side of said bottom section. If the bottom section is folded first, fastening material is provided that at least partially covers the reverse side of said bottom section and the front side of said top section. Fastening material may be provided on both sides of said top and bottom sections so that either the top or bottom section may be folded first.

To accommodate fish having a girth that exceeds the width of the base, thereby preventing releasable engagement of the top and bottom sections to one another, at least one strap is secured to the base at a substantially right angle to the top or bottom section of the base so that a predetermined length of said at least one strap is free. The front side of the at least one strap is at least partially covered with fastening material and said front side releasably engages mating fastening material on the bottom or top section, respectively, when the base is wrapped around the body of a fish.

An elongate, flexible tape measure has a first end permanently secured to the base so that a longitudinal axis of the tape measure is substantially coincident with the longitudinal axis of symmetry of the base.

A fish is positioned in overlying relation to the front side of the base and is wrapped in the base, with or without use of the at least one strap, depending upon the girth of the fish as aforesaid. The tape measure is then brought into parallel, overlying relation to the fish so that the length of the fish may be measured.

At least one stiffener having a predetermined extent is disposed in sliding engagement to the tape measure. The at least one stiffener is held in a substantially vertical plane near the head of the fish and the tape measure is held taut from an exit point of the stiffener in substantially parallel relation to the fish so that the measurement can be made.

At least one suction cup is formed in the middle section of the base on the reverse side so that the base is adapted to be releasably secured to a flat support surface. In the preferred embodiment, a plurality of small suction cups is formed in the middle section near the longitudinal axis of symmetry of the base so that the top and bottom sections of the base are not held to the support surface.

The novel method for measuring the length of a fish includes the steps of providing a base formed of a flat, flexible sheet of material having a generally rectangular configuration, a front side, a reverse side, and a longitudinal axis of symmetry.

The steps further include partitioning the base into a longitudinally-extending top section, a longitudinally-extending middle section, and a longitudinally-extending bottom section, placing a first fastening means in at least partially overlying relation to the top section, placing a second fastening means that releasably engages the first fastening means in at least partially overlying relation to the bottom section, and permanently securing an elongate, flexible tape measure having a first end to the base so that a longitudinal axis of the tape measure is substantially coincident with the longitudinal axis of symmetry of the base.

Still further steps include positioning a fish in overlying relation to the front side with a longitudinal axis of symmetry of the fish being disposed in substantially overlying relation to the longitudinal axis of symmetry of the base, wrapping the fish in the base by bringing the top section and the bottom section of the base into overlying relation to the fish and in engaging relation to one another, and bringing the tape measure into parallel, overlying relation to the fish so that the length of the fish may be measured.

If a fish has a girth too large for the fish to be wrapped as aforesaid in the base, the steps of the novel method further include securing at least one strap to the top or bottom section of the base at a substantially right angle to the longitudinal axis of symmetry of the base so that a predetermined length of said at least one strap is free, and disposing a first fastening means on the at least one strap in at least partially covering relation thereto so that the at least one strap releasably engages a second fastening means that at least partially covers the bottom or top section, respectively, when a fish is wrapped at least partially in said base.

The method further includes the steps of securing a first end of an elongate, flexible tape measure to the base so that a longitudinal axis of the tape measure is substantially coincident with the longitudinal axis of symmetry of the base. After the base has been secured to a preferably horizontally disposed support surface, a fish is positioned atop the front side of the base with its mouth near the first end of the base, and with the longitudinal axis of symmetry of the fish in substantial coincidence with the longitudinal axis of symmetry of the base. The bottom and top sections of the base are folded in wrapping relation to the fish if the girth of the fish is relatively small and at least one strap is used if the girth of the fish is large enough to prevent the base from wrapping around the fish as aforesaid. The tape measure is then extended along the length of the fish to measure the length of the fish.

The method also includes the steps of slideably engaging at least one stiffener along the extent of the measuring tape and positioning the at least one stiffener in a substantially vertical plane near the head of the fish and holding the tape measure taut from an exit point of the stiffener in substantially parallel relation to the fish so that the measurement can be made.

The method further includes the step of forming at least one suction cup in the middle section of the reverse side of the base so that the middle section of the base is adapted to be releasably secured to a flat support surface and the top and middle sections of the base are free to be wrapped about the girth of a fish.

The primary object of the invention is to provide a device that facilitates measuring the length or weight, or both, of a fish or other live animal.

Another important object is to enable the accomplishment of the foregoing object without needing to physically touch the fish or other animal.

Another object is to facilitate hook removal from the lip of a fish.

Yet another object is to reduce the number of fish killed after capture by reducing the time required to measure or weigh a fish, or both, and by restraining the fish during the measuring or weighing process so that the fish does not shorten its lifetime by making thrashing motions that require extra oxygen consumption.

These and other important objects, advantages, and features of the invention will become clear as this description proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2B is a plan view depicting the fish of FIG. 2A when wrapped in the base of the device.

DETAILED DESCRIPTION OF THE PREFERRED EMBODIMENT

Figure 1A:
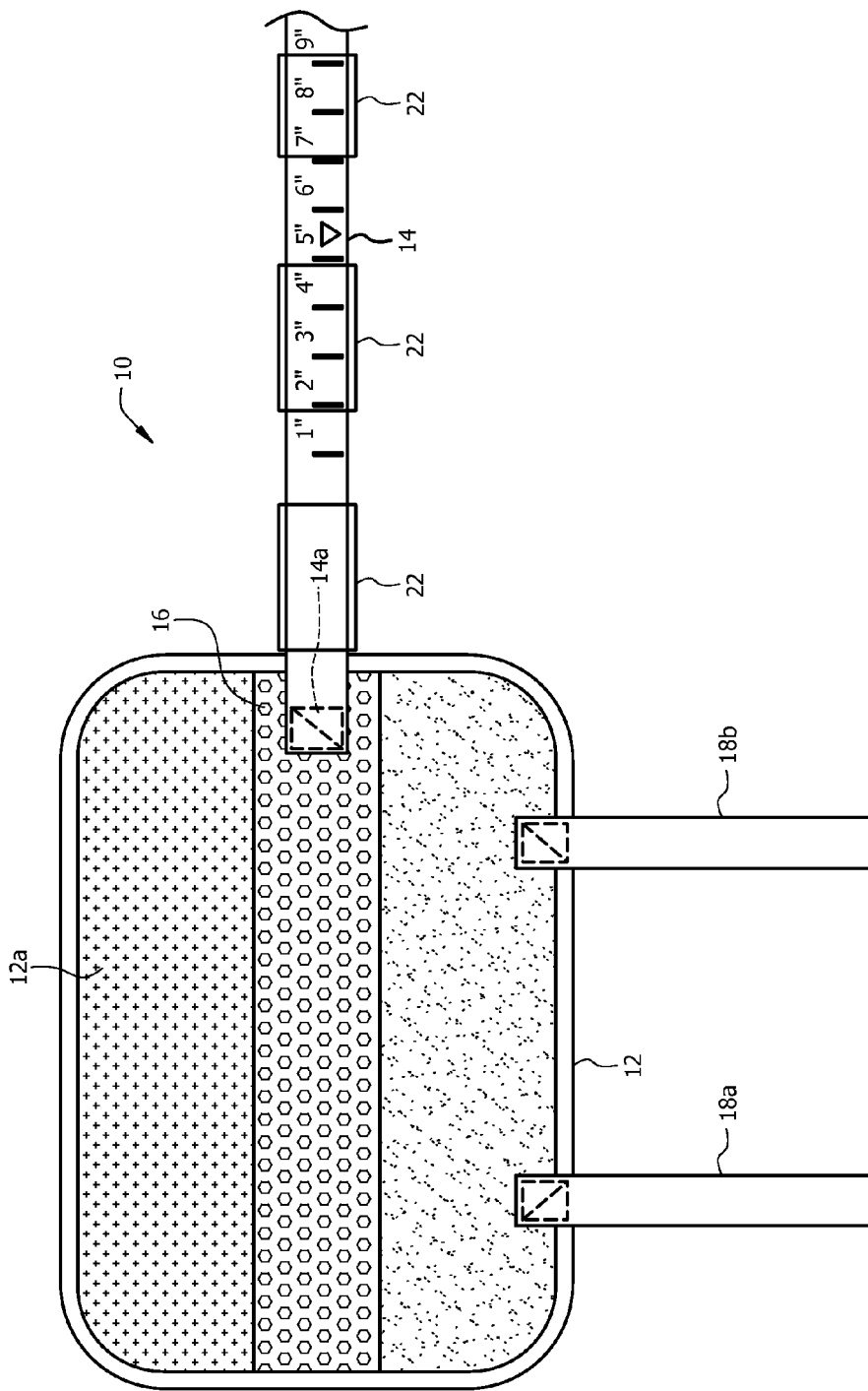
FIG. 1A is a plan view of a reverse side of the novel device.
Figure 1B:
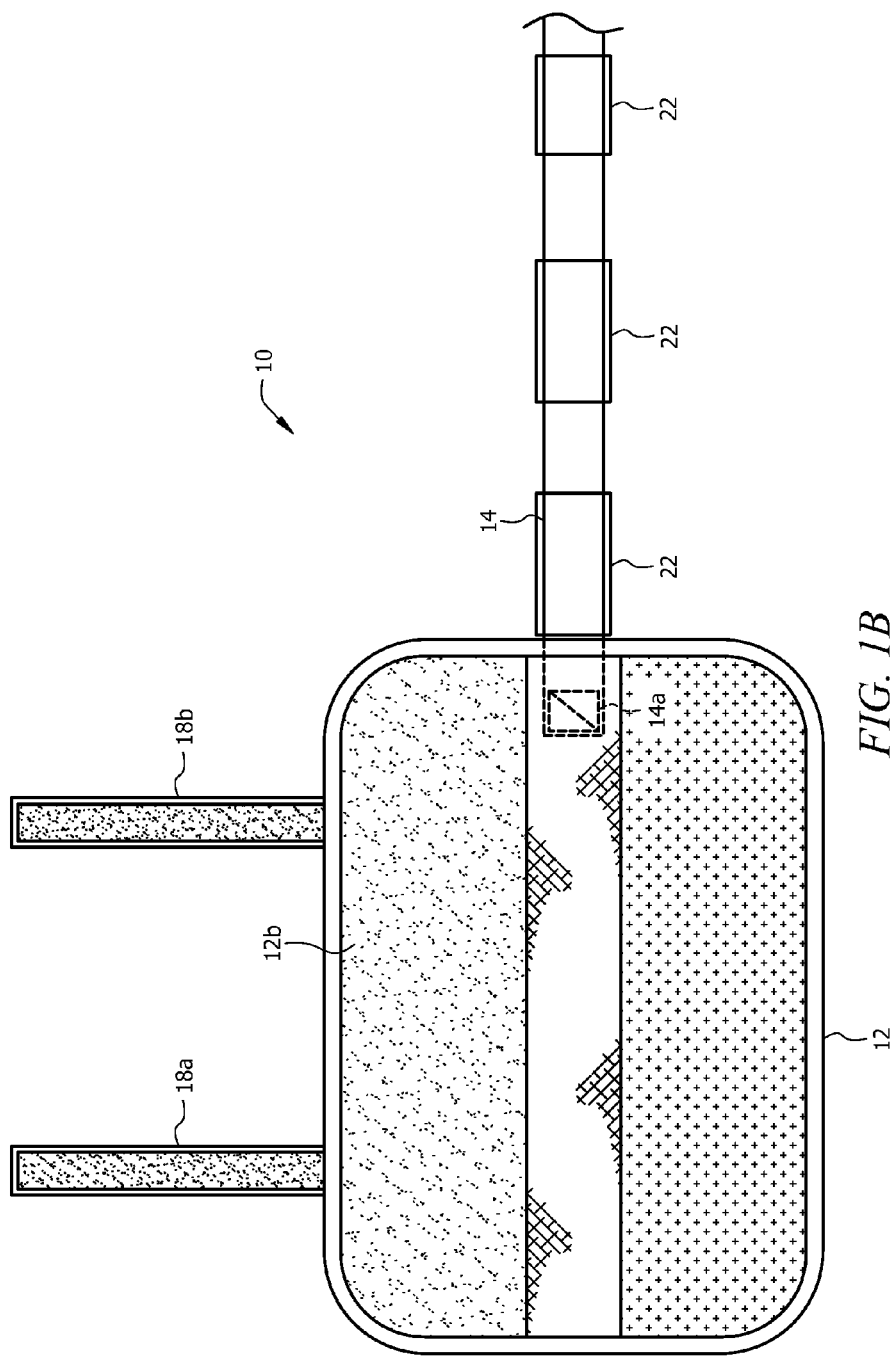
FIG. 1B is a plan view of the front side of the novel device.

FIGS. 1A and 1B depict an illustrative embodiment of the novel fish measuring device which is denoted as a whole by the reference numeral 10. Device 10 includes base 12 and tape measure 14 secured thereto.

FIG. 1A depicts reverse side 12a of base 12 and FIG. 1B depicts front side 12b of said base. Reverse side 12a overlies and is supported by a flat, horizontal support surface on a fishing vessel when device 10 is in use as a length-measuring device. A fish is positioned atop front side 12b of base 12 when it is removed from a body of water.

Reverse side 12a has a plurality of small suction cups, collectively denoted 16, attached thereto or formed therein. Suction cups 16 are preferably confined to a middle, longitudinally-extending region near the longitudinal axis of symmetry of base 12. This leaves the longitudinally-extending top and bottom sections of base 12 free of suction cups so that base 12 can be folded around a fish when the middle section thereof is secured to the flat, horizontal support surface by the suction cups. The flat, horizontal support surface is preferably dedicated to the length measurement of fish. Small suction cups 16 hold the middle section of the base 12 against slippage and therefore hold device 10 in place when it is not in use and when it is in use during the fish length measuring process. A large number of small suction cups as depicted is preferred but one or two larger suction cups could perform substantially the same function.

Many other means for releasably securing base 12 to a horizontal or vertical support surface are within the scope of this invention but suction cups are preferred because it is important to minimize the amount of time that the fish is out of the water. Attachment devices that require more time to secure than suction cups are therefore not preferred.

The device will also work with no attachment means, but the level of performance of the device when unattached to a support surface is believed to be below that of a secured device.

Base 12 is preferably of rectangular construction as depicted with rounded corners but other geometric configurations are within the scope of this invention. Fish are generally longer than they are wide and are typically narrower than they are high so a rectangular shape is deemed to be preferable to a square, triangular, or irregular shape.

Base 12 is formed of a flexible material so that it can be easily wrapped about a fish. The flexible material is also preferably waterproof so that water on the fish does not soak through base 12. Vinyl or a vinyl-like material is believed to meet the flexibility and waterproof criteria. The waterproof feature also enables a user to avoid fish smell contamination.

Either the front or the reverse side of the top section of base 12, or both, is at least partially covered by hook and loop fastening means such as VELCRO® fastening material. Moreover, either the front or the reverse side of the bottom section of base 12, or both, is at least partially covered by hook and loop fastening means that releasably engage the hook and loop fastening means of the top section.

Instead of at least partially covering the reverse and front sides of the top and bottom sections, an embodiment could include a fastening means in at least partially covering relation to the front side of the top section and the reverse side of the bottom section so that a fish could be wrapped by first folding the bottom section upwardly over the belly of the fish and the top section secondly downwardly over the spine of the fish. In the alternative, another embodiment could include a fastening means in at least partially covering relation to the reverse side of the top section and the front side of the bottom section so that a fish could be wrapped by first folding the top section downwardly over the spine of the fish and the bottom section secondly upwardly over the belly of the fish.

The preferred fastening means are mating or complementary hook and loop fastening members that releasably engage one another in a well-known way.

The hooks and loops may be replaced by mating snaps and buckles, strings that can be tied to one another, a zipper, buttons, and numerous other fastening means, all of which are within the scope of this invention. Hook and loop fastening means are preferred for their effectiveness, speed, and ease of use.

Straps 18a, 18b in this particular embodiment are respectively secured to the front or reverse side of base 12 at right angles to a longitudinal axis of base 12 at the top or bottom section of base 12 at respective first ends of said straps so that a length of each strap is free. Each strap may be covered on a first, front side with a first hook and loop fastening means. As best understood from a comparison of FIGS. 2B and 3A, straps 18a, 18b are needed only when a fish has a girth that prevents it from being wrapped by base 12.

Tape measure 14 is elongate, flexible, and made from a waterproof material such as the material of which base 12 is made. Tape measure 14 has a first end 14a sewn, stapled, or otherwise permanently secured to front or reverse side 12a of base 12 so that a longitudinal axis of said tape measure is substantially coincident with the longitudinal axis of symmetry base 12.

Although not required, one of more stiffeners, collectively denoted 22, may be slideably positioned in engaging relation to tape measure 14 along its extent. Stiffeners 22 are preferably formed of a transparent plastic but may be formed of any other material that does not corrode when wet.

Figure 2A:
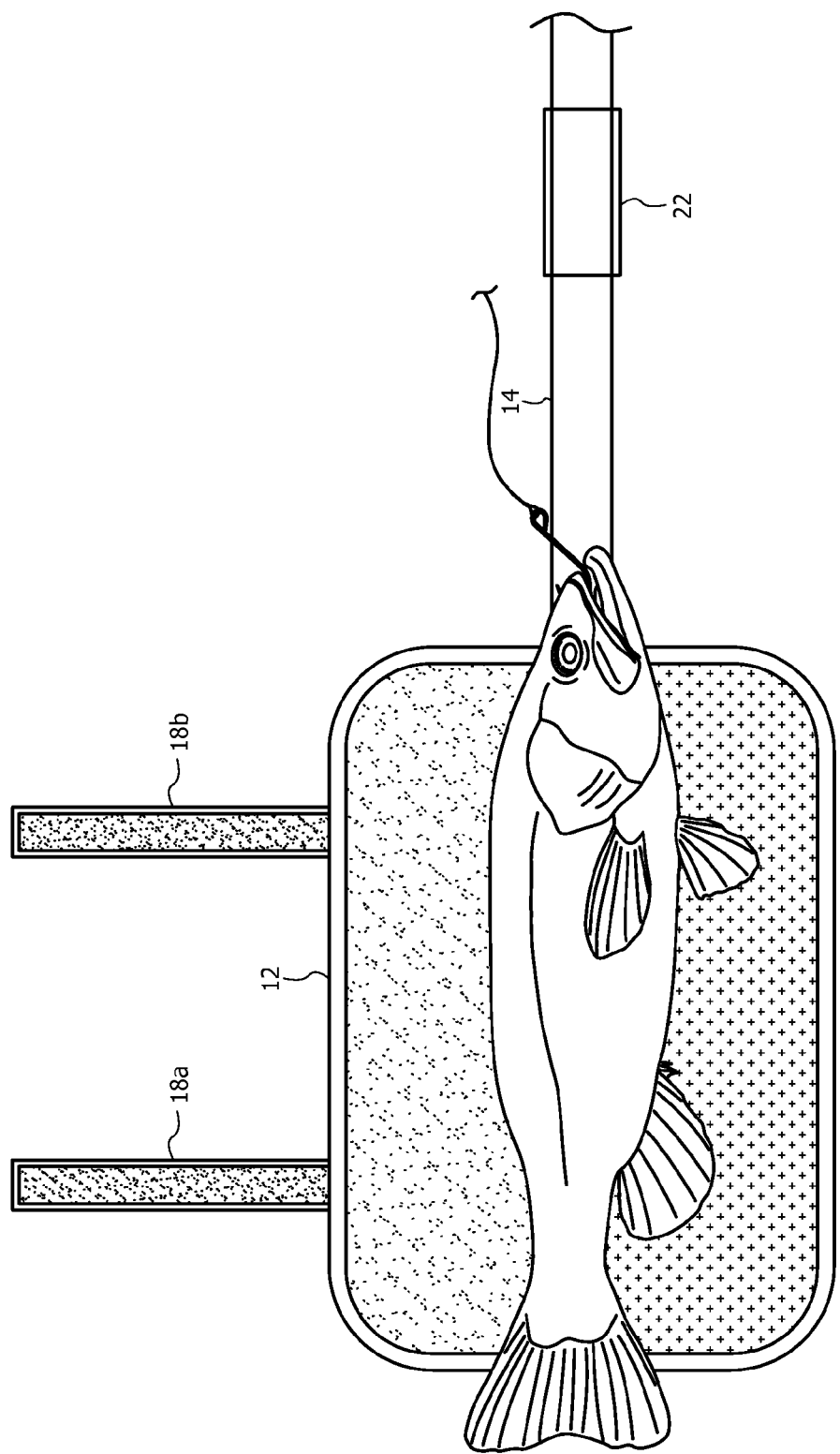
FIG. 2A is a plan view depicting a fish of relatively small girth disposed atop said front side.

FIG. 2A depicts a fish of relatively small girth that has been placed into overlying relation to front side 12b of base 12 immediately after its retrieval from a body of water. The fishhook is still in position.

FIG. 2B depicts the fish after base 12 has been folded over said fish and the respective fastening means of the top and bottom sections of base 12 have engaged one another to hold the fish in a substantially immobile position. The fishhook is removed, preferably with a de-hooking device 13 as depicted, as soon as the fish is wrapped. This enables the user to avoid touching the fish during the de-hooking procedure.

Securing the fish as depicted in FIGS. 2A and 2B prevents it from thrashing around and thereby prolongs its viability when out of the water, thereby accomplishing an important object of the invention. It also facilitates removal of the fishhook with a de-hooking device as indicated in FIG. 2B without requiring that the fish be touched. Securing the fish against movement thus also accomplishes another important object of the invention.

Figure 3A:
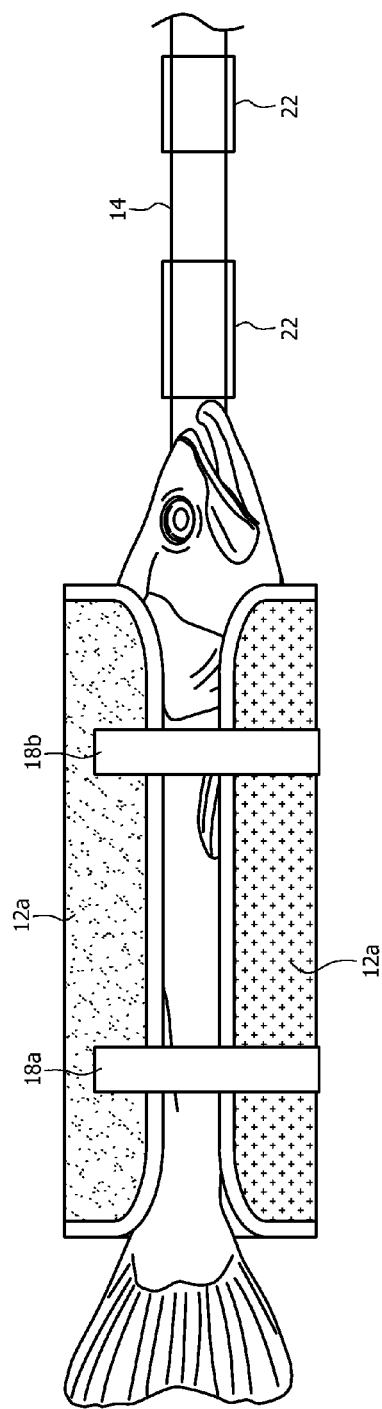
FIG. 3A is a plan view depicting a fish of relatively large girth disposed atop said front side.
Figure 3B:
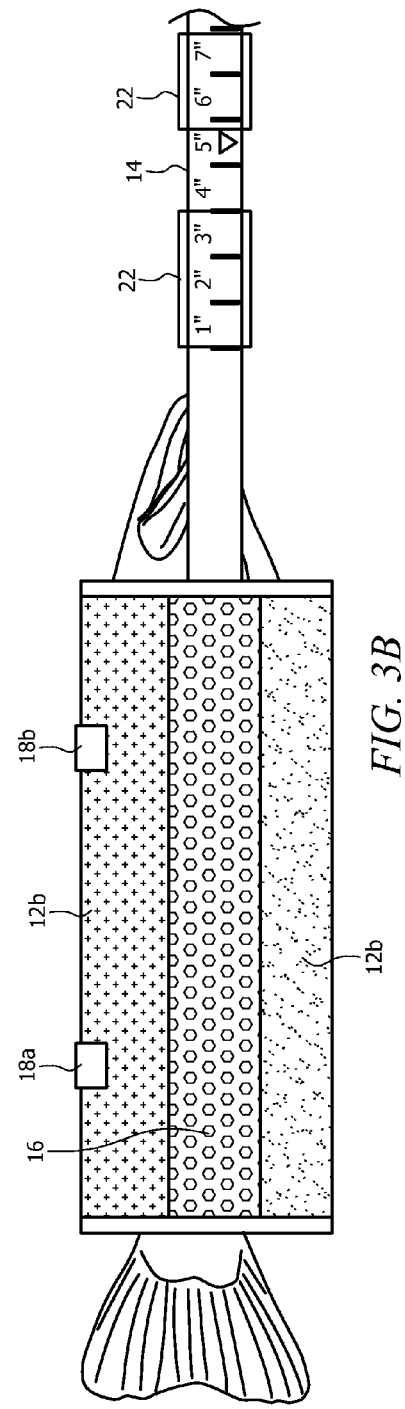
FIG. 3B depicts the reverse side of the structure of FIG. 3A.

FIG. 3A indicates the use of elongate straps 18a, 18b when a fish has a girth that prevents the top and bottom sections of base 12 from releasably engaging one another. FIG. 3B depicts the reverse side of the structure depicted in FIG. 3A.

Figure 4A:
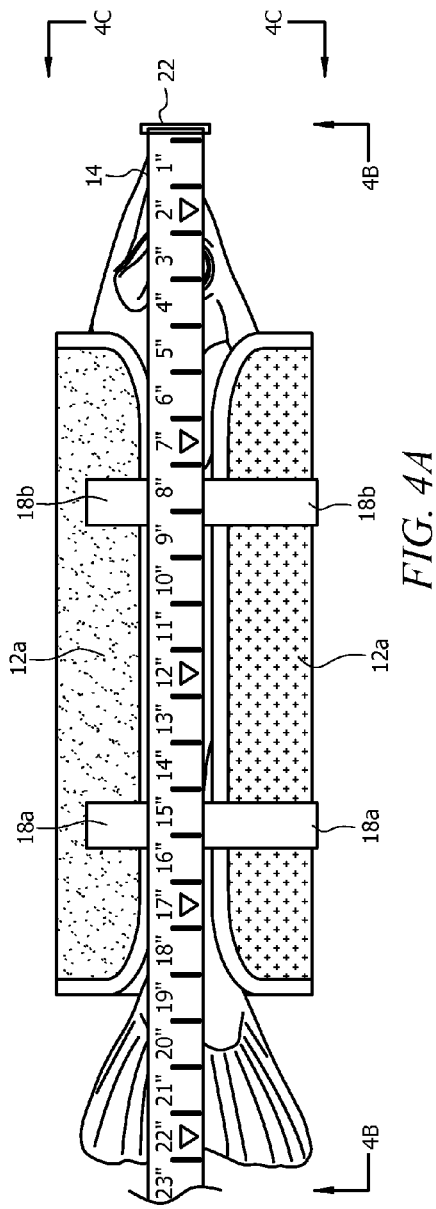
FIG. 4A is a plan view depicting the tape measure deployed to measure the length of the fish depicted in FIGS. 3A and 3B.
Figure 4B:
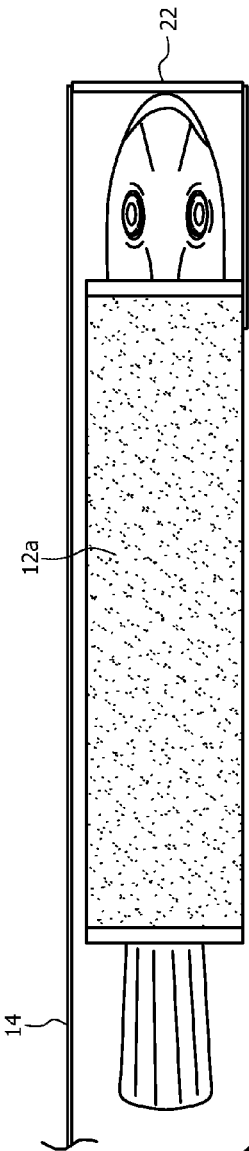
FIG. 4B is a view taken along 4B-4B in FIG. 4A.
Figure 4C:
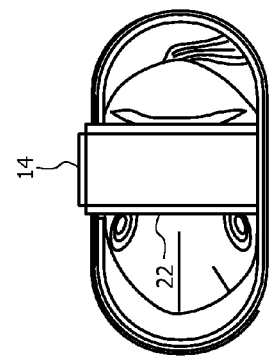
FIG. 4C is a view taken along 4C-4C in FIG. 4A.

FIG. 4A depicts measurement of the length of the fish in plan view, FIG. 4B depicts said measurement in front elevation, and FIG. 4C depicts said measurement in end view. When measuring a relatively narrow fish, only one slide member 22 is used to stiffen the end of tape measure 14 that is nearest the mouth of the fish. When measuring a relatively thick fish, as depicted in FIGS. 4A, 4B, and 4C, two or more slide members may be used to stiffen the end of tape measure 14 that is nearest the mouth of the fish. The stiffener or stiffeners hold the vertical extent of tape measure 14 straight and enables the horizontal extent thereof to form a right angle with said stiffeners so that the length of the fish is more accurately measured.

The fishhook should be removed before the fish is measured so that the hook does not interfere with the measurement.

Figure 5A:
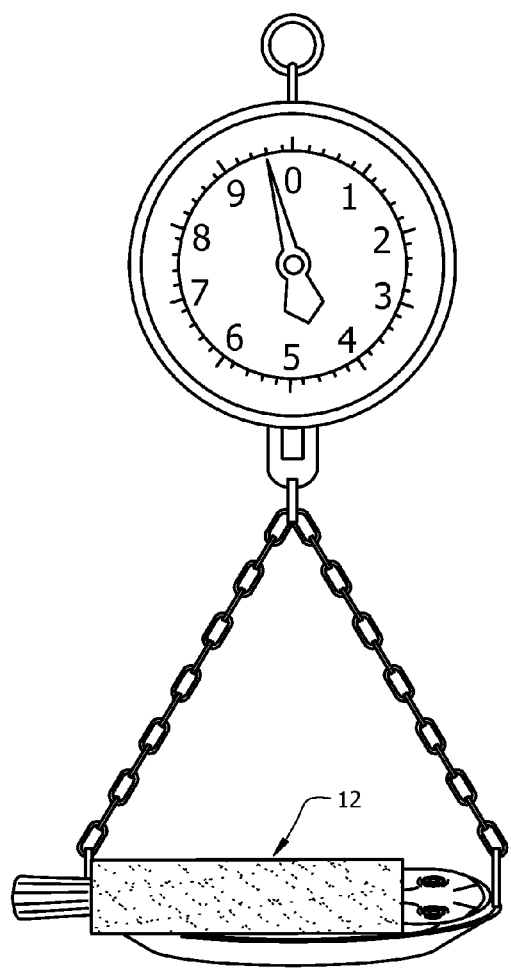
FIG. 5A depicts a fish being weighed in an analog scale.
Figure 5B:
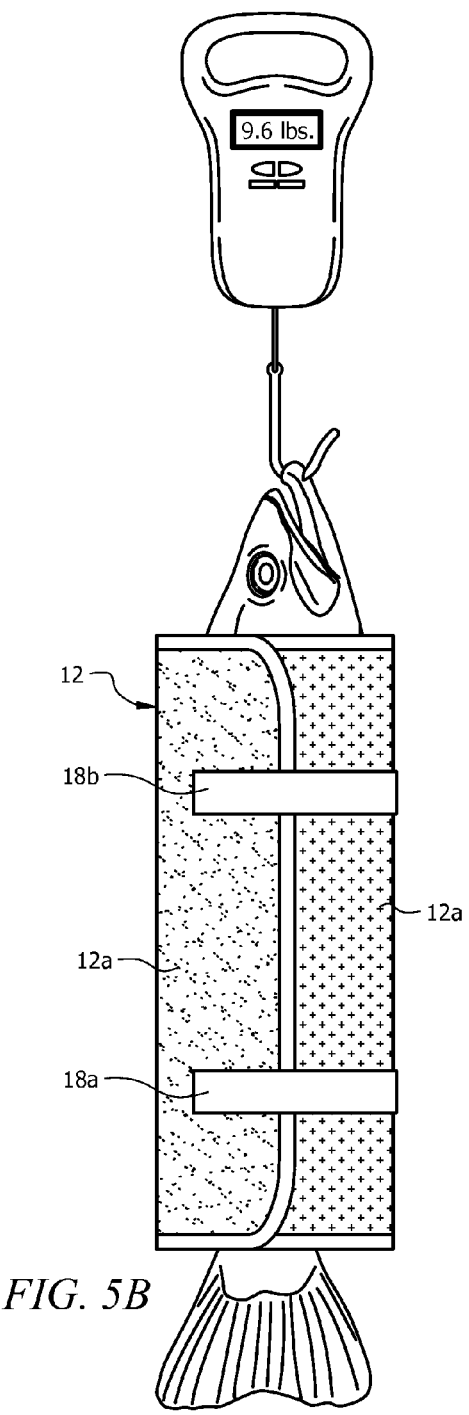
FIG. 5B depicts a fish being weighed on a digital scale.

FIG. 5A depicts a fish wrapped by the novel device being weighed in an analog scale and FIG. 5B depicts a fish wrapped by the novel device being weighed by a digital scale. The novel device helps speed the weighing process and improves its accuracy because the immobilized fish cannot jump out of the pan of the analog scale and the immobilization of the fish also speeds the weighing process and improves the accuracy of the reading when a digital scale is used.

Figure 6:
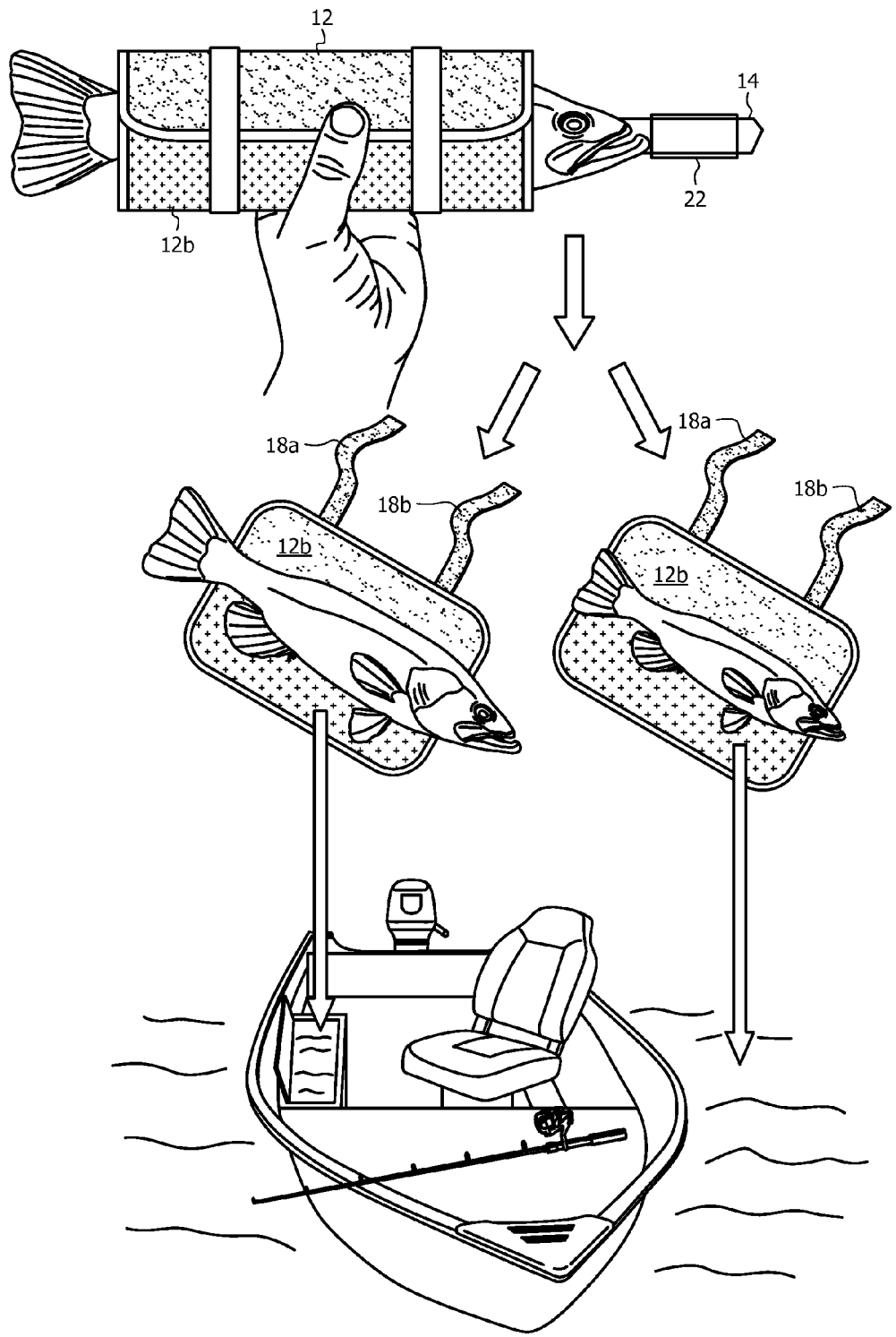
FIG. 6 is a diagrammatic view depicting release of a large fish into a container and a small fish into a body of water.

After the length of the fish is measured, the device and fish are lifted from the horizontal support surface by manually overcoming the suction force provided by suction cups 16 and the weighing is performed, if needed. Depending upon the results of the length or weight measurement, or both, the fish is returned to the water or deposited into an onboard container as depicted in FIG. 6 by disengaging the top and bottom parts of the base from one another in the context of a fish of small girth or releasing straps 18a, 18b in the context of a fish of large girth. Such release does not require that the fish be touched directly with the user's hands, thereby preventing a fish smell from being transferred onto the user's hands and thereby accomplishing another important object of the invention.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A fish measuring device, comprising:
a base formed of a flat, flexible, waterproof sheet of material having a generally rectangular configuration, a front side, a reverse side, and a longitudinal axis of symmetry;
said base having a longitudinally-extending top section, a longitudinally-extending middle section, and a longitudinally-extending bottom section;
a first fastening means disposed in at least partially overlying relation to said top section;
a second fastening means that releasably engages said first fastening means disposed in at least partially overlying relation to said bottom section;
an elongate, flexible tape measure having a first end permanently secured to said base so that a longitudinal axis of said tape measure is substantially coincident with said longitudinal axis of symmetry of said base;
whereby a fish is positioned in overlying relation to said front side with a longitudinal axis of said fish being disposed in substantial coincidence with said longitudinal axis of symmetry of said base;
whereby said fish is wrapped in said base by bringing said top section and said bottom section of said base into overlying relation to said fish and in engaging relation to one another and;
whereby said tape measure is positioned in parallel, overlying relation to said fish so that the length of said fish may be measured.

2. The device of claim 1, further comprising:
at least one strap secured to said top section of said base at a substantially right angle to said longitudinal axis of symmetry of said base at a first end thereof so that a predetermined length of said at least one strap is free;
said at least one strap having a fastening means disposed in at least partially covering relation thereto so that said at least one strap releasably engages said fastening means that at least partially covers said bottom section of said base when a fish is wrapped at least partially in said base.

3. The device of claim 1, further comprising:
at least one stiffener disposed in sliding engagement to said tape measure;
said at least one stiffener having a predetermined extent;
whereby said at least one stiffener is held in a substantially vertical plane near the head of said fish and said tape measure is held taut from an exit point of said stiffener in substantially parallel relation to said fish so that said measurement can be made.

4. The device of claim 1, further comprising
at least one suction cup positioned in said middle section on said reverse side so that said base is adapted to be releasably secured to a flat support surface.

5. The device of claim 4, further comprising:
said at least one suction cup including a plurality of small suction cups formed in said middle section of said base.

6. A method for measuring the length of a fish, comprising the steps of:
providing a base formed of a flat, flexible, waterproof sheet of material having a generally rectangular configuration, a front side, a reverse side, and a longitudinal axis of symmetry;
partitioning said base into a longitudinally-extending top section, a longitudinally-extending middle section, and a longitudinally-extending bottom section;
placing a fastening means in at least partially overlying relation to said top section;
placing a fastening means in at least partially overlying relation to said bottom section;
permanently securing an elongate, flexible tape measure having a first end to said base so that a longitudinal axis of said tape measure is substantially coincident with said longitudinal axis of symmetry of said base;
positioning a fish in overlying relation to said front side with a longitudinal axis of said fish being disposed in substantially overlying relation to said longitudinal axis of symmetry of said base;
wrapping said fish in said base by bringing said top section and said bottom section of said base into overlying relation to said fish and in engaging relation to one another; and
positioning said tape measure into parallel, overlying relation to said fish so that the length of said fish may be measured.

7. The method of claim 6, further comprising the steps of:
securing at least one strap to said top section of said base at a substantially right angle to said longitudinal axis of symmetry of said base at a first end thereof so that a predetermined length of said at least one strap is free;
disposing a fastening means on said at least one strap in at least partially covering relation thereto so that said at least one strap releasably engages said fastening means that at least partially covers said bottom section of said base when a fish is wrapped at least partially in said base.

8. The method of claim 7, further comprising the steps of:
providing at least one stiffener having a predetermined extent;
disposing said at least one stiffener in sliding relation to said tape measure;
positioning said at least one stiffener in a substantially vertical plane near the head of said fish and holding said tape measure taut from an exit point of said stiffener in substantially parallel relation to said fish so that said measurement can be made.

9. The method of claim 8, further comprising the steps of:
forming at least one suction cup in said middle section of said base so that said device is adapted to be releasably secured to a flat support surface.

* * * * *